(12) United States Patent
Ba-abbad et al.

(10) Patent No.: US 8,834,683 B2
(45) Date of Patent: Sep. 16, 2014

(54) HEAT EXCHANGER STEAM CONDENSER WATER DISTILLATION

(75) Inventors: Mazen A. Ba-abbad, Riyadh (SA); Hany A. Al-Ansary, Riyadh (SA); Essam A. Al-Ammar, Riyadh (SA)

(73) Assignee: King Saud University, Riyadh (SA)

( * ) Notice: Subject to any disclaimer, the term of this patent is extended or adjusted under 35 U.S.C. 154(b) by 435 days.

(21) Appl. No.: 13/236,605

(22) Filed: Sep. 19, 2011

(65) Prior Publication Data

US 2013/0068608 A1     Mar. 21, 2013

(51) Int. Cl.
| | | |
|---|---|---|
| *C02F 1/04* | (2006.01) | |
| *B01D 3/02* | (2006.01) | |
| *B01D 5/00* | (2006.01) | |
| *C02F 1/16* | (2006.01) | |
| *C02F 103/08* | (2006.01) | |

(52) U.S. Cl.
CPC ... *C02F 1/16* (2013.01); *B01D 3/02* (2013.01); *C02F 1/048* (2013.01); *C02F 2103/08* (2013.01); *B01D 5/006* (2013.01); *C02F 1/043* (2013.01); *B01D 5/0006* (2013.01)
USPC .......... 202/180; 202/189; 202/190; 159/26.2; 165/163

(58) Field of Classification Search
CPC ............ C02F 1/04; C02F 1/048; C02F 1/043; C02F 1/16; C02F 2103/08; B01D 3/02; B01D 5/006; B01D 5/0006
USPC ........... 202/180, 185.1, 189, 190; 203/10, 11, 203/22; 159/23, 24.2, 26.2, 28.6; 165/110, 165/121, 122, 157, 163
See application file for complete search history.

(56) References Cited

U.S. PATENT DOCUMENTS

| | | | | |
|---|---|---|---|---|
| 3,224,948 A | * | 12/1965 | Akers | 202/192 |
| 5,565,065 A | * | 10/1996 | Wang | 202/176 |
| 6,375,805 B1 | * | 4/2002 | Dableh | 203/10 |
| 2007/0007120 A1 | * | 1/2007 | Taylor | 203/1 |
| 2009/0223650 A1 | * | 9/2009 | Williams et al. | 165/104.17 |
| 2009/0229796 A1 | * | 9/2009 | Williams et al. | 165/121 |
| 2009/0229797 A1 | * | 9/2009 | Williams et al. | 165/121 |
| 2009/0229798 A1 | * | 9/2009 | Williams et al. | 165/121 |
| 2012/0234665 A1 | * | 9/2012 | Ba-abbad | 203/10 |
| 2013/0068608 A1 | * | 3/2013 | Ba-abbad et al. | 203/11 |

FOREIGN PATENT DOCUMENTS

DE        3419006 A1 * 11/1985 ............... C02F 1/08

* cited by examiner

*Primary Examiner* — Nina Bhat
*Assistant Examiner* — Jonathan Miller
(74) *Attorney, Agent, or Firm* — Lowe Hauptman & Ham, LLP

(57) ABSTRACT

Heat exchanger steam condenser water distillation is described. In one aspect, a water distillation condenser has a heated air conduit in air flow communication with a heat exchanger. A cold raw water compartment is disposed above the heated air conduit and at least a bottom surface of the cold raw water compartment disposed at an angle. A heated raw water channel is defined between the heated air conduit and the raw water compartment. A floor of the heated raw water channel is defined by a top of the heated air conduit. A distilled water trough is disposed below a lower extent of the cold raw water compartment.

14 Claims, 4 Drawing Sheets

HEAT EXCHANGER STEAM CONDENSER WATER DISTILLATION

BACKGROUND

Conventional water desalination and/or purification systems require considerable amounts of energy and/or equipment. Existing low quality heat systems used to purify water (e.g. solar stills) are generally inefficient. Most existing steam condensers allow cooling water to evaporate and low salinity water is continuously added to the system, which exhausts water resources.

SUMMARY

The described systems and methods relate to heat exchanger steam condenser water distillation, wherein a water distillation condenser has a heated air conduit in air flow communication with a heat exchanger. A cold raw water compartment is disposed above the heated air conduit and at least a bottom surface of the cold raw water compartment is disposed at an angle. A heated raw water channel is defined between the heated air conduit and the cold raw water compartment. A floor of the heated raw water channel is defined by a top of the heated air conduit. A distilled water trough is disposed below a lower extent of the cold raw water compartment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
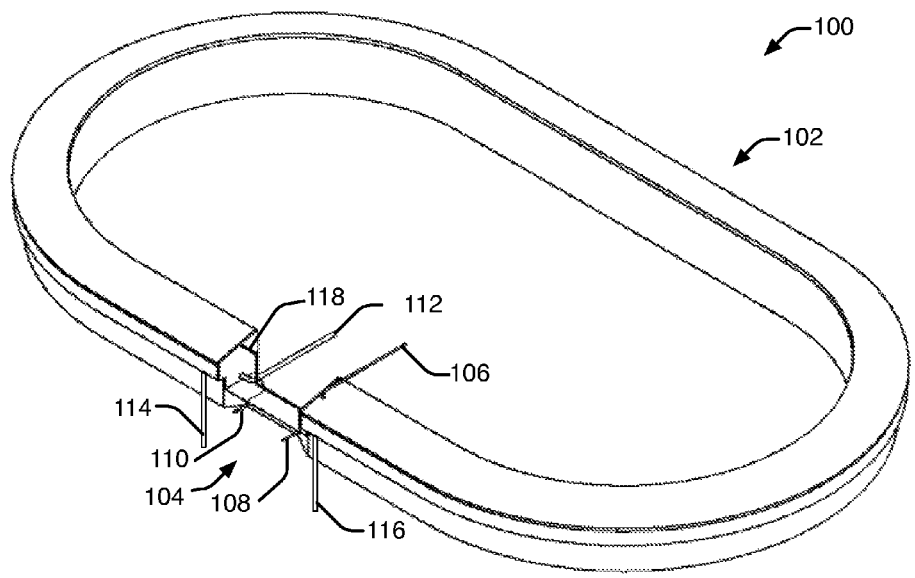
FIG. 1 is a diagrammatic perspective view of an example heat exchanger steam condenser water distillation system, according to one embodiment.

The systems and methods described herein relate to desalination and distillation of water, while condensing low-grade steam, and at the same time pre-heating process water. The present systems and methods have the advantages of design simplicity, easy maintenance, easy assembly and disassembly, and low cost.

In accordance with various implementations of the present systems and methods low-grade steam, such as exhaust steam from a steam turbine, enters the present water distillation system through a steam inlet. This inlet leads to a serpentine coil, or the like, inside an air venturi heat exchanger. Air passing through the heat exchanger's air venturi is cooled by a nozzle and suction effect, which reduces the temperature and pressure of the air. As a result, the steam in the serpentine coil condenses to water and heat from the steam is carried out by the air passing through the air venturi heat exchanger. Air passing out of the air venturi heat exchanger passes through a diffuser defining the outlet of the air venturi heat exchanger, where its pressure and temperature increases. The air pressure and temperature increased by one or more fans disposed in the diffuser.

In accordance with various implementations of the present systems and methods the hot air from the air venturi heat exchanger passes into a lower heated air conduit of a raceway water distillation steam condenser. This hot air heats raw water disposed in a raw water conduit above. Such implementations of a raceway water distillation condenser include a raw cold-water upper compartment. Raw cold water is pumped into the upper compartment and vapor from the heated water in the raw water conduit condenses into distilled water on a bottom of the raw cold water upper compartment. This distilled water is collected and discharged outside the system for use, such as for drinking water. The cold raw water in the upper compartment warms-up because of condensation of the vapor from the hot water below. This warmed raw water circulates down to feed the raw hot water disposed in the raw hot water conduit. After the raw hot water reaches its maximum heat, it may be discharged outside the system where it can exchange heat with the condensed steam from the heat exchanger to pre-heat it, such as for reuse in the aforementioned steam turbine.

Particular examples discussed herein use low-grade steam, such as exhaust steam from a steam turbine, to heat air in a heat exchanger, which is used to heat raw water. However, the present systems and methods can utilize heat from any number of sources and need not necessarily employ a heat exchanger. For example, (concentrated) solar water heating, geothermal heat, low temperature exhaust heat, or the like, may be used to provide low-grade steam for use in a heat exchanger and/or to directly heat the raw water to be distilled. Whereas, most existing steam condensers allow cooling water to evaporate and low salinity water is continuously added to the system, the present systems and methods may combine the functionality of the steam condenser and that of a solar still or the like. Thereby to provide and enhanced solar still system that condenses the low grade steam and produces distilled water with extra-heat input from solar energy, in accordance with various implementations.

Also, particular examples discussed herein are described generically, with reference to "distillation" of water. However, the present systems and methods are intended for use in any sort of purification of water including, but not limited to desalination, and/or the like.

An Exemplary Heat Exchanger Steam Condenser Water Distillation System

FIG. 1 is a diagrammatic perspective view of example heat exchanger steam condenser water distillation system 100, according to one embodiment. Water distillation system 100 includes condenser raceway 102 and air venturi heat exchanger 104. Raw water to be distilled, such as sea, lake or river water enters system 100, particularly condenser raceway 102, via raw water inlet 106. Low-quality steam, used by implementations of the present systems and methods to heat the raw water for distillation, enters system 100, particularly heat exchanger 104, via steam inlet 108. Water, condensed from steam in heat exchanger 104 exits system 100, via condensate outlet 110. Heated raw water, which may be used to preheat water, such as condensate water exiting condensate outlet 110, for use in a steam turbine, or the like, may exit via hot concentrated raw water outlet 112. Distilled water exits system 100 via distilled water outlets 114 and/or 116. Transfer pipe 118 may be used to transfer somewhat heated water from an upper raw water compartment into a heated raw water channel.

Figure 2:
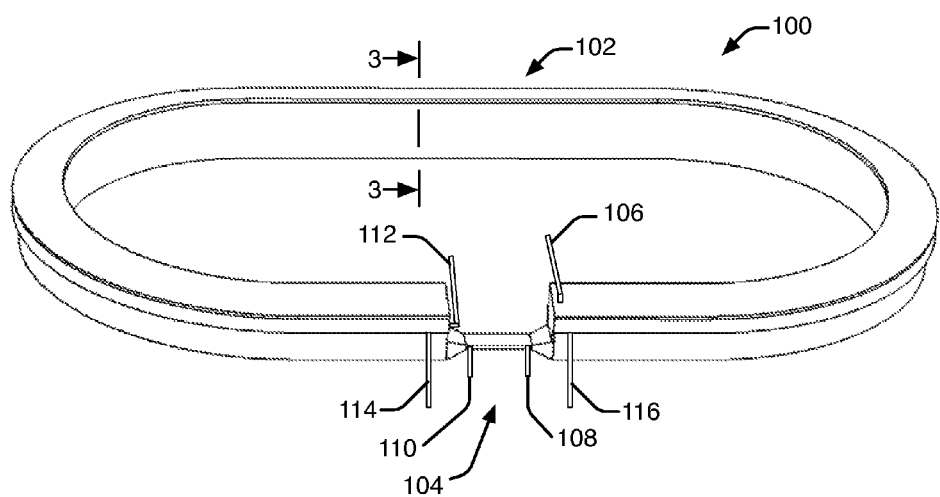
FIG. 2 is another diagrammatic perspective view of the example heat exchanger steam condenser water distillation system of FIG. 1, according to one embodiment.

FIG. 2 is another diagrammatic perspective view of example heat exchanger steam condenser water distillation system 100 of FIG. 1, according to one embodiment. Therein, condenser raceway 102, heat exchanger 104, raw water inlet 106, steam inlet 108, condensate outlet 110, hot concentrated raw water outlet 112 and distilled water outlet 114 and 116 can be seen from another perspective.

Figure 3:
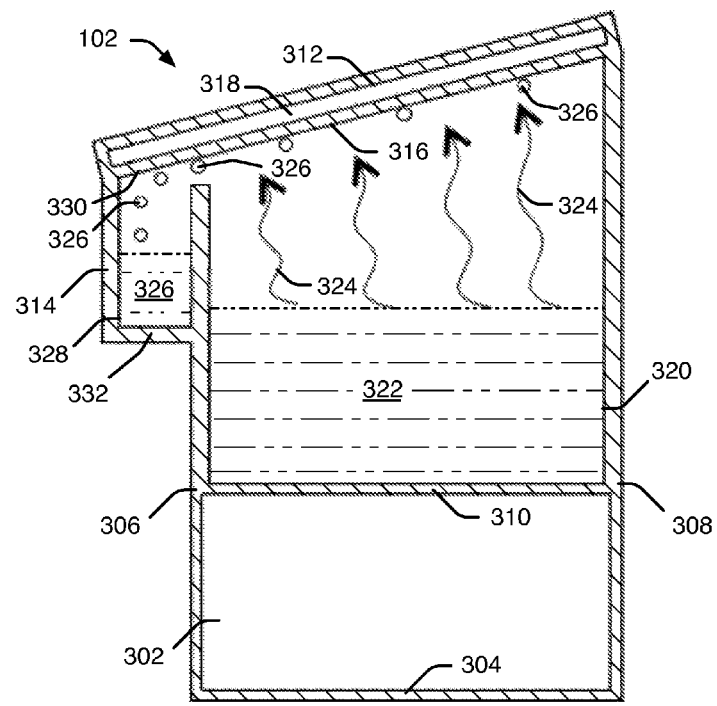
FIG. 3 is an enlarged, generally cross-sectional view of a condenser raceway of the example heat exchanger steam condenser water distillation system of FIGS. 1 and 2, such as may be taken generally along line 3-3 of FIG. 2, according to one embodiment.

FIG. 3 is an enlarged, generally cross-sectional view of water distillation condenser raceway 102 of system 100 of FIGS. 1 and 2, such as may be taken generally along line 3-3 of FIG. 2, according to one embodiment. In accordance with various implementations, water distillation condenser raceway 102 comprises lower heated air conduit 302 in air flow communication with a heat exchanger, such as illustrated inline air venturi heat exchanger 104. In accordance with the illustrated implementation heated air conduit 302 is defined by raceway floor 304, intermediate raceway wall 306, outer raceway wall 308, and conduit top 310.

Upper cold raw water compartment 312 is disposed across a top of condenser raceway 102, extending between upper extents of outer raceway wall 306 and inner raceway wall 314, with at least bottom surface 316 of cold raw water compartment 312 disposed at an angle (not horizontal). Cold raw water 318 filling raw water compartment 312 is supplied via raw water inlet 106. (See FIGS. 1 and 2.)

Open-top heated raw water channel 320 is defined between heated air conduit 302 and upper cold raw water compartment 312, such as by outer raceway wall 308 and intermediate raceway wall 306. In accordance with such implementations, top 310 of heated air conduit 302 defines a floor of heated raw water channel 320.

Thereby, heat from the heated air in heated air conduit 302 heats raw water 322 in heated raw water channel 320. At least a portion of heated raw water 322 evaporates from heated raw water channel 320, forming water vapor 324. Water vapor 324 heats bottom surface 316 of the cold raw water compartment 312, heating cold raw water 318 in upper raw water compartment 312. In accordance with implementations of the present systems and methods, vapor 324 condenses on bottom surface 316 of cold raw water compartment 312 forming droplets or streams of distilled water 326, which flow down raw water compartment bottom surface 316 into distilled water trough 328.

In accordance with such implementations, distilled water trough 328 is disposed below lower extent 330 of upper raw water compartment bottom surface 306, defined by distilled water trough floor 332, extending between intermediate raceway wall 306 and inner raceway wall 314. Distilled water may be drawn from distilled water trough 328, via distilled water outlets 114 and/or 116, or the like, exiting system 100 for use, such as drinking.

Figure 4:
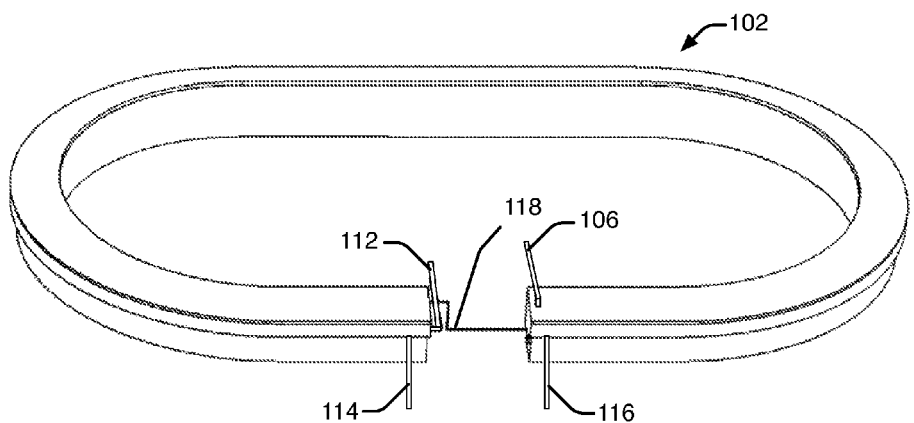
FIG. 4 is a partially fragmented diagrammatic perspective view of the example heat exchanger steam condenser water distillation system of FIGS. 1 and 2, according to one embodiment.

FIG. 4 is a partially fragmented diagrammatic perspective view of example water distillation condenser 102, according to one embodiment, showing exemplary transfer pipe 118, which may be used to transfer somewhat heated water from upper raw water compartment 312 (shown in FIG. 3) into heated raw water channel 320 (also shown in FIG. 3).

As shown in the illustrated embodiments, the condenser raceway may be generally elliptical in shape. In particular, the heated air conduit, heated water conduit, upper wall and distilled water conduit may be generally elliptical in shape and concentric.

Figure 5:
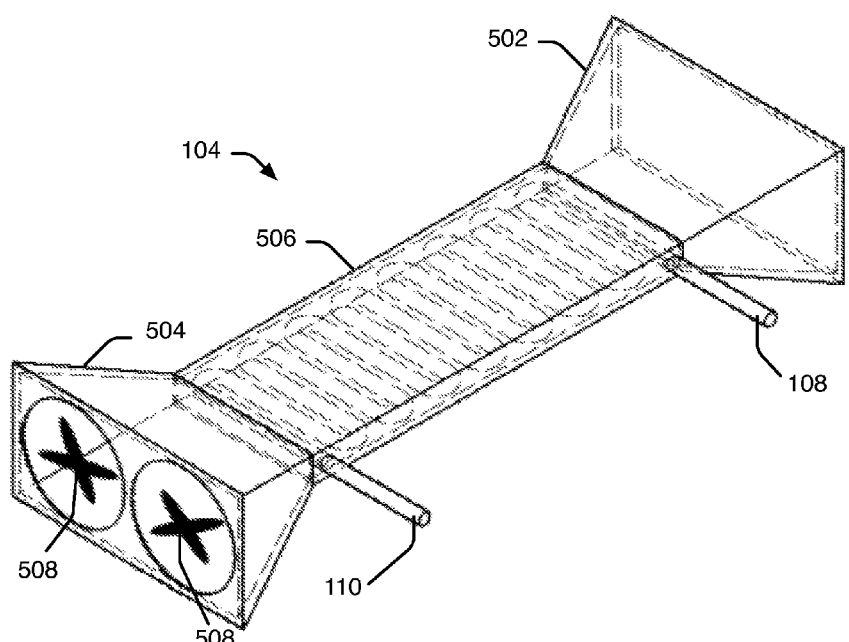
FIG. 5 is an enlarged diagrammatic perspective view of an air venturi heat exchanger of the example heat exchanger steam condenser water distillation system of FIGS. 1 and 2, according to one embodiment.

FIG. 5 is an enlarged diagrammatic perspective view of air venturi heat exchanger 104 of example heat exchanger steam condenser water distillation system 100 of FIGS. 1 and 2, according to one embodiment. Air venturi heat exchanger 104 is a an air venturi disposed for inline air flow communication with heated air conduit 302 described with respect to FIGS. 1, 2 and 3, above.

Air venturi heat exchanger 104 defines air venturi inlet 502, air venturi outlet 504, and an air constriction passage 506 extending between air venturi inlet 502 and air venturi outlet 504. In accordance with various implementations, air venturi outlet 504 may act as a diffuser. One or more fans (508) may be disposed in the air venturi heat exchanger, such as, by way of example, in air venturi outlet 504, as illustrated in FIG. 5, to draw air through air venturi heat exchanger 104. In particular, fans 508 may draw air into air venturi inlet 502, through air constriction passage 506 and out air venturi outlet 504.

As noted above, low-quality steam, used by implementations of the present systems and methods to heat raw water for distillation, enters system 100, particularly air venturi heat exchanger 104, via steam inlet 108. Water, condensed from steam in air venturi heat exchanger 104 exits system 100, via condensate outlet 110.

Figure 6:
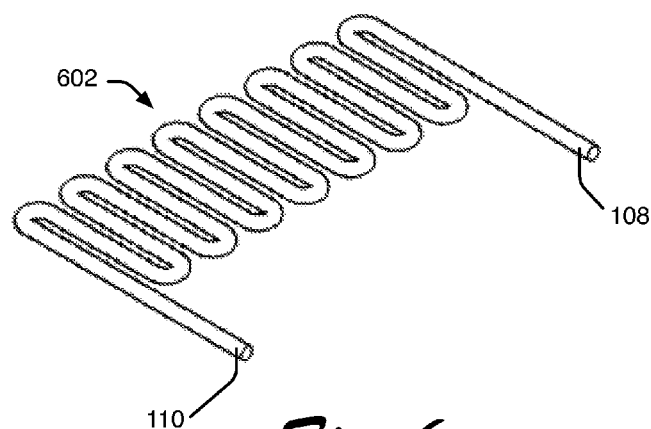
FIG. 6 is an enlarged diagrammatic perspective view of the of an example of a coil for the example air venturi heat exchanger of FIG. 5, according to one embodiment.

FIG. 6 is an enlarged diagrammatic perspective view of example steam coil 602 for use in air venturi heat exchanger 104 of FIG. 5, according to one embodiment. Steam coil 602 may be disposed in air constriction passage 506. Steam coil 602 includes steam inlet 108 and a condensed water outlet 110. As seen in FIG. 6, implementations of steam coil 602 may have a serpentine shape.

In accordance with assorted implementations, system 100 circulates steam received via steam inlet 108 through a serpentine coil 602 of air venturi heat exchanger 104, cooling and reducing pressure of the steam. In air venturi heat exchanger 104, the steam is condensed to water and its heat is transferred, at least in part to the surrounding air in constriction passage 506. The heated air passes through air venturi outlet diffuser 504, drawn by fans 508, where the air's pressure and temperature are increased. The hot air, passes into a lower conduit 302 of condenser raceway 102 and heats raw water for distillation, as described above, with respect to FIG. 3.

In accordance with various implementations, raw water is circulated through upper cold water compartment 312, transfer pipe 118, and heated raw water channel 320 in one direction. Heated air is circulated, such as by fans 508 of air venturi heat exchanger 104, in an opposite direction. As discussed above, raw water 318 in upper raw water compartment 312 is used to condense water vapor 324. The raw water leaving cold water compartment 312 will exit as warm water as a result of this heat exchange. Thus, in accordance with various implementations of the present systems and methods, a temperature gradient may be maintained such that the upper surface (i.e. bottom surface 316 of upper raw water compartment 312) is always colder than the lower surface (i.e. the surface of heated raw water 322 in heated raw water channel 320). To this end, very hot air exiting air venturi heat exchanger 104 into lower hot air conduit 302 will result in warmer water at the surface of heated raw water 322 in heated raw water channel 320 near air venturi heat exchanger outlet diffuser 504, and less hot air in lower hot air conduit 302, such as near air venturi inlet 502, will result in cooler heated raw water in raw water channel 320.

An Exemplary Water Distillation Procedure

Figure 7:
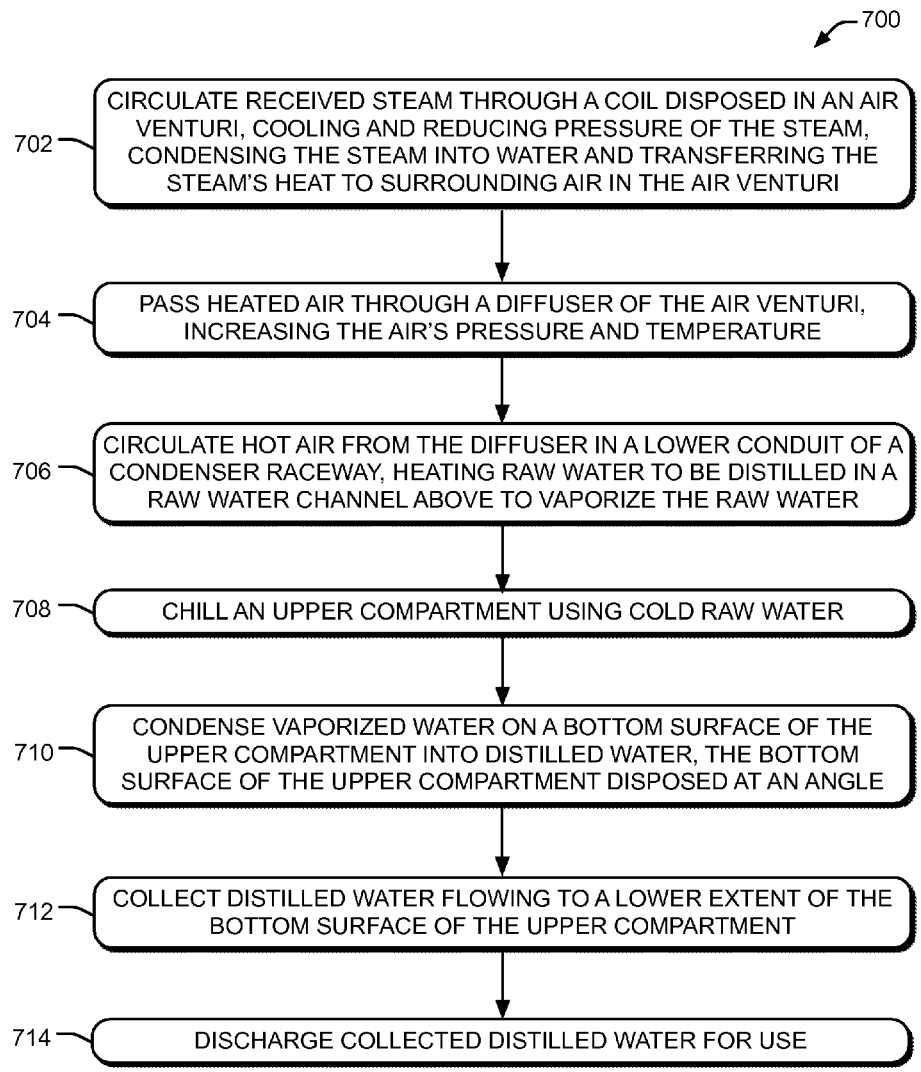
FIG. 7 shows an example procedure for heat exchanger steam condenser water distillation, according to one embodiment.

FIG. 7 shows example procedure 700 for heat exchanger steam condenser water distillation, according to one embodiment, such as may be carried out employing heat exchanger steam condenser water distillation system 100, described above. Procedure 700 for water distillation calls for circulating received steam through a coil disposed in an air venturi at 702. This results in cooling and reducing pressure of the steam, condensing the steam into water, while transferring the steam's heat, at least in part, to surrounding air in the air venturi. At 704, the heated air is passed through a diffuser of the air venturi., increasing the air's pressure and temperature. Hot air from the diffuser is circulated in a lower conduit of a condenser raceway at 706, heating raw water to be distilled in a raw water channel above so as to vaporize the raw water. The passing of the heated air at 704 to circulate it through the conduit at 706 may be accomplished by drawing air through the air venturi using one or more fans disposed in the diffuser.

At 708 an upper compartment is chilled using cold raw water. As a result, the vaporized raw water condenses on a bottom surface of the upper compartment at 710 into distilled water. This condensation is aided by bottom surface of the upper compartment being chilled by the cold raw water. Since the bottom surface of the upper compartment is disposed at an angle, distilled water flowing to a lower extent of the bottom surface of the upper compartment may be collected at 712 and discharged at 714 for use. In accordance with some implementations, at least some portion of water heated in the upper compartment may be transferred to the raw water channel at 716 for heating and distillation. Also, in accordance with various implementations heat from raw water heated in the raw water channel, such as once the raw water reaches a maximum heat may be exchanged with condensed steam from the coil at 718 to preheat the condensed steam prior to further use of the condensed steam in an industrial process or prior to heating for use in the present systems and methods as low-grade steam.

CONCLUSION

Although systems and methods for heat exchanger steam condenser water distillation have been described in language specific to structural features and/or methodological operations or actions, it is understood that the implementations defined in the appended claims are not necessarily limited to the specific features or actions described. Rather, the specific features and operations of heat exchanger steam condenser water distillation are disclosed as exemplary forms of implementing the claimed subject matter.

The invention claimed is:

1. A water distillation condenser raceway comprising:
    a heated air conduit in air flow communication with a heat exchanger;
    a cold raw water compartment disposed above the heated air conduit, at least a bottom surface of the cold raw water compartment disposed at an angle;
    a heated raw water channel, defined between the heated air conduit and the raw water compartment, a floor of the heated raw water channel defined by a top of the heated air conduit:
    a distilled water trough, disposed below a lower extent of the cold raw water compartment; and
    wherein the condenser raceway is generally elliptical in shape and the heated air conduit, cold raw water compartment, heated raw water channel, and distilled water trough are concentric.

2. The water distillation condenser raceway of claim 1, further comprising a transfer pipe extending from the cold raw water compartment to the heated raw water channel.

3. The water distillation condenser raceway of claim 1, wherein heat from the heated air conduit heats raw water in the heated raw water channel.

4. The water distillation condenser raceway of claim 1, wherein heated water evaporating from the heated raw water channel heats a bottom surface of the cold raw water compartment, heating the cold raw water in the cold raw water compartment.

5. The water distillation condenser raceway of claim 1, wherein heated water evaporating from the heated raw water channel condenses on the bottom surface of the cold raw water compartment, as distilled water.

6. The water distillation condenser raceway of claim 1, wherein distilled water condensed on the bottom surface of the cold raw water compartment flows to the lower extent of the bottom surface of the of the cold raw water compartment and is received in the distilled water trough.

7. The water distillation condenser raceway of claim 1, wherein heat from the heated air conduit heats raw water in the heated raw water channel, heated water evaporates from the heated raw water channel, heating a bottom surface of the cold raw water compartment and the cold raw water in the cold raw water compartment and condensing on the bottom surface of the cold raw water compartment as distilled water that flows to the lower extent of the bottom surface of the of the cold raw water compartment and is received in the distilled water trough.

8. The water distillation condenser raceway of claim 1, further comprising:
    an air venturi disposed in inline air flow communication with the heated air conduit, the air venturi defining an air venturi inlet, an air venturi outlet, and an air constriction passage extending between the air venturi inlet and the air venturi outlet;
    a steam coil disposed in the air constriction passage, the steam coil comprising a steam inlet and a condensed water outlet; and
    at least one fan disposed in the air venturi.

9. The water distillation condenser raceway of claim 8, wherein the air venturi outlet acts as a diffuser.

10. The water distillation condenser raceway of claim 8, wherein the at least one fan is disposed in the air venturi outlet.

11. The water distillation condenser raceway of claim 8, wherein the at least one fan draws air into the air venturi inlet, through the air constriction passage and out the air venturi outlet.

12. A water distillation system comprising:
    a heat exchanger comprising:
        an air venturi defining an air venturi inlet, an air venturi outlet diffuser, and an air constriction passage extending between the air venturi inlet and the air venturi outlet;
        a steam coil disposed in the air constriction passage, the steam coil comprising a steam inlet and a condensed water outlet; and
        at least one fan disposed in the air venturi; and
    a condenser raceway comprising:
        a heated air conduit, the air venturi of the heat exchanger disposed in inline air flow communication with the heated air conduit;
        a cold raw water compartment, disposed above the heated air conduit, at least a bottom surface of the cold raw water compartment disposed at an angle;
        a heated raw water channel, defined between the heated air conduit and the raw water compartment, a floor of the heated raw water channel defined by a top of the heated air conduit;
        a distilled water trough, disposed below a lower extent of the cold raw water compartment;

a transfer pipe extending from the cold raw water compartment to the heated raw water channel; and wherein the condenser raceway is generally elliptical in shape and the heated air conduit, cold raw water compartment, heated raw water channel and distilled water trough are concentric.

13. The water distillation system of claim 12, wherein the at least one fan is disposed in the air venturi outlet diffuser and the at least one fan draws air into the air venturi inlet, through the air constriction passage, out the air venturi outlet diffuser and through the heated air conduit.

14. The water distillation system of claim 12, wherein heat from the heated air conduit heats raw water in the heated raw water channel, heated water evaporating from the heated raw water channel, heating a bottom surface of the raw water compartment and the cold raw water in the raw water compartment and condensing on the bottom surface of the cold raw water compartment, as distilled water that flows to the lower extent of the bottom surface of the of the cold raw water compartment and is received in the distilled water trough.

\* \* \* \* \*